US012237552B2

(12) United States Patent
Shanmuganathan et al.

(10) Patent No.: US 12,237,552 B2
(45) Date of Patent: Feb. 25, 2025

(54) COMPOSITION FOR FUEL CELL MEMBRANES AND A PROCESS FOR THE PREPARATION THEREOF

(71) Applicant: Council of Scientific & Industrial Research, New Delhi (IN)

(72) Inventors: Kadhiravan Shanmuganathan, Maharashtra (IN); Farsa Ram, Maharashtra (IN); Ashish Kishore Lele, Maharashtra (IN)

(73) Assignee: COUNCIL OF SCIENTIFIC & INDUSTRIAL RESEARCH, New Delhi (IN)

( * ) Notice: Subject to any disclaimer, the term of this patent is extended or adjusted under 35 U.S.C. 154(b) by 340 days.

(21) Appl. No.: 17/613,626

(22) PCT Filed: May 26, 2020

(86) PCT No.: PCT/IN2020/050470
§ 371 (c)(1),
(2) Date: Nov. 23, 2021

(87) PCT Pub. No.: WO2020/240585
PCT Pub. Date: Dec. 3, 2020

(65) Prior Publication Data
US 2022/0311037 A1    Sep. 29, 2022

(30) Foreign Application Priority Data
May 27, 2019  (IN) .............................. 201911020868

(51) Int. Cl.
*H01M 8/1044*  (2016.01)
*C08J 5/22*  (2006.01)
(Continued)

(52) U.S. Cl.
CPC ......... *H01M 8/1044* (2013.01); *C08J 5/2237* (2013.01); *H01M 8/1025* (2013.01);
(Continued)

(58) Field of Classification Search
CPC ............ H01M 8/1044; H01M 8/1025; H01M 8/1027; H01M 8/103; H01M 8/1032;
(Continued)

(56) References Cited

U.S. PATENT DOCUMENTS

2009/0208806 A1    8/2009  Izuhara et al.
2014/0193741 A1*   7/2014  Sung ................... H01M 8/1058
                                                               429/492

FOREIGN PATENT DOCUMENTS

CN        103715438 A  *  4/2014  ............ C08J 5/2256
WO        2019066534 A2    4/2019

OTHER PUBLICATIONS

Xu, et al., "Polydopamine-coated cellulose microfibrillated membrane as high performance lithium-ion battery separator", 2014, RSC Advances, vol. 4, pp. 7845-7850 (Year: 2014).*
(Continued)

*Primary Examiner* — Daniel S Gatewood
(74) *Attorney, Agent, or Firm* — Dinsmore & Shohl LLP

(57) ABSTRACT

The present invention relates to a composition for fuel cell membranes and a process for the preparation thereof. In particular, the present invention relates to thermo-mechanically and chemically stable polymer electrolyte membranes which have been prepared without compromising proton conductivity by using multifunctional polydopamine and mechanically robust nanocellulose.

1 Claim, 8 Drawing Sheets

Figure 1:
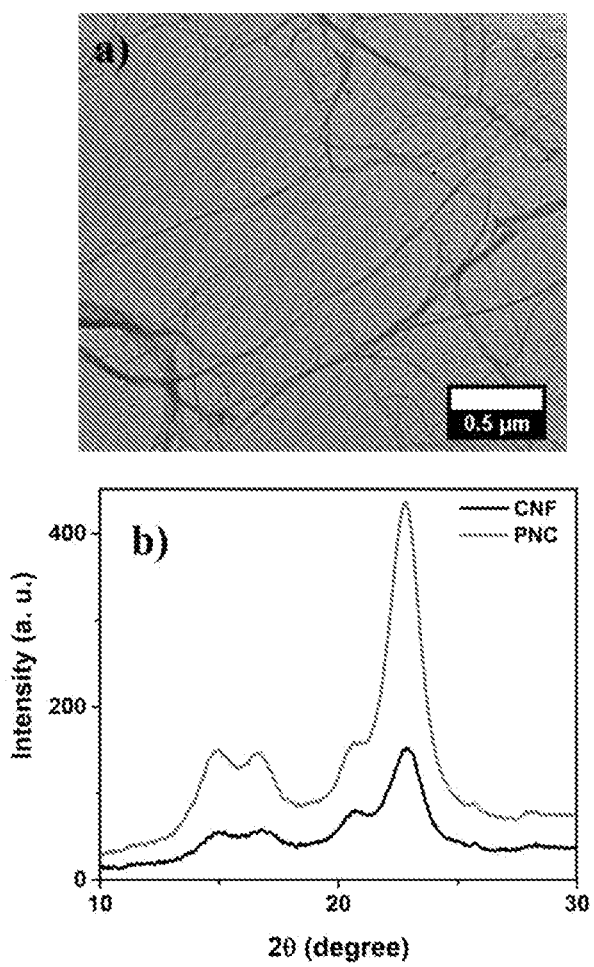

(51) Int. Cl.
  *H01M 8/10* (2016.01)
  *H01M 8/1025* (2016.01)
  *H01M 8/1027* (2016.01)
  *H01M 8/103* (2016.01)
  *H01M 8/1032* (2016.01)
  *H01M 8/1039* (2016.01)
  *H01M 8/1067* (2016.01)

(52) U.S. Cl.
  CPC ......... *H01M 8/1027* (2013.01); *H01M 8/103* (2013.01); *H01M 8/1032* (2013.01); *H01M 8/1039* (2013.01); *H01M 8/1067* (2013.01); *C08J 2327/18* (2013.01); *C08J 2401/02* (2013.01); *C08J 2479/02* (2013.01); *H01M 2008/1095* (2013.01); *H01M 2300/0082* (2013.01); *H01M 2300/0091* (2013.01)

(58) Field of Classification Search
  CPC ............ H01M 8/1039; H01M 8/1067; H01M 2008/1095; H01M 2300/0082; H01M 2300/0091; H01M 2300/0094; H01M 8/1069; C08J 5/2237; C08J 2327/18; C08J 2401/02; C08J 2479/02; Y02E 60/50; B82Y 40/00
  See application file for complete search history.

(56) References Cited

OTHER PUBLICATIONS

International Search Report mailed Apr. 9, 2020 in reference to co-pending Indian Patent Application No. PCT/IN2020/050470 filed May 26, 2020.

Written Opinion mailed Apr. 9, 2020 in reference to co-pending Indian Patent Application No. PCT/IN2020/050470 filed May 26, 2020.

Kumar, et al., "Graphite oxide/Nafion composite membranes for polymer electrolyte fuel cells", RSC Advances, vol. 2, pp. 8777-8782, 2012.

Li, et al., "Nafion-functionalized electrospun poly(vinylidene fluoride) (PVDF) nanofibers for high performance proton exchange membranes in fuel cells", Journal of Materials Chemistry A, vol. 2, pp. 3783-3793, 2014.

Jiang, et al., "Baterial nanocellulose/Nafion composite membranes for low temperature polymer electrolyte fuel cell", Journal of Power Soures, vol. 273, pp. 697-706, 2015.

Xu, et al., "Polydopamine-coated cellulose microfibrillated membrane as high performance lithium-ion battery separator", RSC Advances, vol. 4, pp. 7845-7850, 2014.

* cited by examiner

COMPOSITION FOR FUEL CELL MEMBRANES AND A PROCESS FOR THE PREPARATION THEREOF

CROSS REFERENCES TO RELATED APPLICATIONS

This application is a national-stage application under 35 U.S.C. § 371 of International Application No. PCT/IN2020/050470, filed May 26, 2020, which International Application claims benefit of priority to Indian patent application No. 201911020868, filed May 27, 2019.

FIELD OF THE INVENTION

The present invention relates to a composition for fuel cell membranes and a process for the preparation thereof. In particular, the present invention relates to thermo-mechanically and chemically stable polymer electrolyte membranes. More particularly, the present invention relates to enhancement in the thermo-mechanical and chemical stability of the polymer electrolyte membrane by using multifunctional polydopamine and mechanically robust nanocellulose. The invention further relates to a process for the preparation of the said polymer electrolyte membranes. The membranes developed in the present invention find application in the fields of fuel cells, solid electrolyte membrane for batteries and other electrochemical devices.

BACKGROUND OF THE INVENTION AND DESCRIPTION OF PRIOR ART

Polymer electrolyte membrane, Nafion is a sulfonated tetrafluoroethylene based fluoropolymer-copolymer. Presence of perfluorovinyl ether groups terminated with sulfonate groups onto a tetrafluoroethylene (Teflon) backbone results into first in class ionic properties of Nafion. Nafion is known as a proton conductor for proton exchange membrane (PEM) fuel cells. Nafion can be manufactured with various cationic conductivities. Nafion has broad range of application due to its properties. Nafion is used in fuel cells, electrochemical devices, chlor-alkali production, metal-ion recovery, water electrolysis, plating, surface treatment of metals, batteries, sensors, Donnan dialysis cells, drug release, gas drying or humidifaction, and superacid catalysis for the production of fine chemicals. Nafion is also often cited for theoretical potential (i.e., thus far untested) in a number of fields.

Fuel cells have now a days found attention due to their potential to efficiently produce clean energy from hydrogen. Nafion is known as a membrane for proton exchange membrane (PEM) fuel cells by permitting hydrogen ion transport while preventing electron conduction. But, the operation conditions in a fuel cell could lead to radical initiated degradation of perfluorosulfonic acid ionomer. The radicals can be generated by splitting of hydrogen peroxide (produced from two electron reduction of oxygen) in the presence of transition metal cation or heat. The second pathway of radical generation is hydrogen or oxygen crossover at low and high currents, respectively. The crossover of gases leads to presence of hydrogen and oxygen on same Pt electrode (cathode or anode) and ultimately results in radical generation. Along with this chemical stability problem, Nafion also suffers from thermomechanical stability at elevated temperature and mechanical properties such as elastic modulus and tensile strength starts decreasing drastically near 80° C.

Several attempts have been made to produce Nafion composite membranes with different composite materials to enhance proton conductivity and mechanical stability. The articles titled "Graphite oxide/Nafion composite membranes for polymer electrolyte fuel cells" by R. Kumar, C. Xu, K. Scott, published in the journal *"RSC Advances* 2 (2012) 8777-8782" reports GO based Nafion composite membrane exhibiting higher proton conductivity at 80° C. and enhanced mechanical stability. But, it does not provide any information on the thermo-mechanical properties and chemical stability of the membrane.

The article titled "Nafion-functionalized electrospun poly (vinylidene fluoride) (PVDF) nanofibers for high performance proton exchange membranes in fuel cells" by H. Y. Li, Y. L. Liu, published in the journal *"J. Mater. Chem. A,* 2 (2014) 3783-3793" reports PVDF/Nafion composite membrane, which shows good proton conductivity and mechanical stability but the process is complicated involving electrospinning to make nanofibres.

The article titled "Bacterial nanocellulose/Nafion composite membranes for low temperature polymer electrolyte fuel cells" by G. P. Jiang, J. Zhang et. al, published in the journal *"J. Power Sources* 273 (2015) 697-706" reports blending of bacterial cellulose (BC) with Nafion to fabricate BC/Nafion nanocomposite membrane. But, the proton conductivity of BC/Nafion composite membrane (1:9 mass ratio) is slightly lower than that of Nafion at 30° C. and 100% relative humidity (RH).

Therefore, keeping in view the drawbacks of the hitherto reported prior arts, the inventors of the present invention realized that there exists a dire need to develop Nafion composite membranes, which exhibit thermo-mechanical as well as chemical stability with increase in proton conductivity.

OBJECTIVES OF THE PRESENT INVENTION

The main objective of the present invention is therefore to provide chemically and thermo-mechanically stable polymer electrolyte membrane with enhanced proton conductivity which obviates the drawbacks of the hitherto reported prior art.

Another objective of the present invention is to provide novel polymer electrolyte membrane comprising of Nafion with polydopamine coated nanocellulose.

Yet another objective of the present invention is to provide a composition for fuel cell membranes as well as a process for the preparation thereof.

Still another objective of the present invention is to provide a process for the preparation of the developed polymer electrolyte membranes.

| ACRONYMS USED IN THE INVENTION | |
|---|---|
| PDA | Polydopamine |
| PNC | Polydopamine coated nanocellulose |
| PNC/Nafion | Composite membrane of Polydopamine coated nanocellulose and Nafion |
| CNF | Nanocellulose fiber |
| DI | Deionized |
| IEC | Ion Exchange Capacity |
| IPA | Isopropyl alcohol |
| EtOH | Ethyl alcohol |

SUMMARY OF THE INVENTION

The present invention relates to a new composite membrane of polydopamine coated nanocellulose with Nafion and a process for its preparation.

In an embodiment the present invention provides thermo-mechanically and chemically stable polymer electrolyte membrane comprising of Nafion and polydopamine coated nanocellulose, wherein said stability is dependent on the concentration of PNC in Nafion. Oxidative polymerization of polydopamine on the nanocellulose fibers results into PNC and further incorporation of PNC in Nafion by solution blending results into PNC/Nafion, a composite polymer electrolyte membrane.

Figure 12:
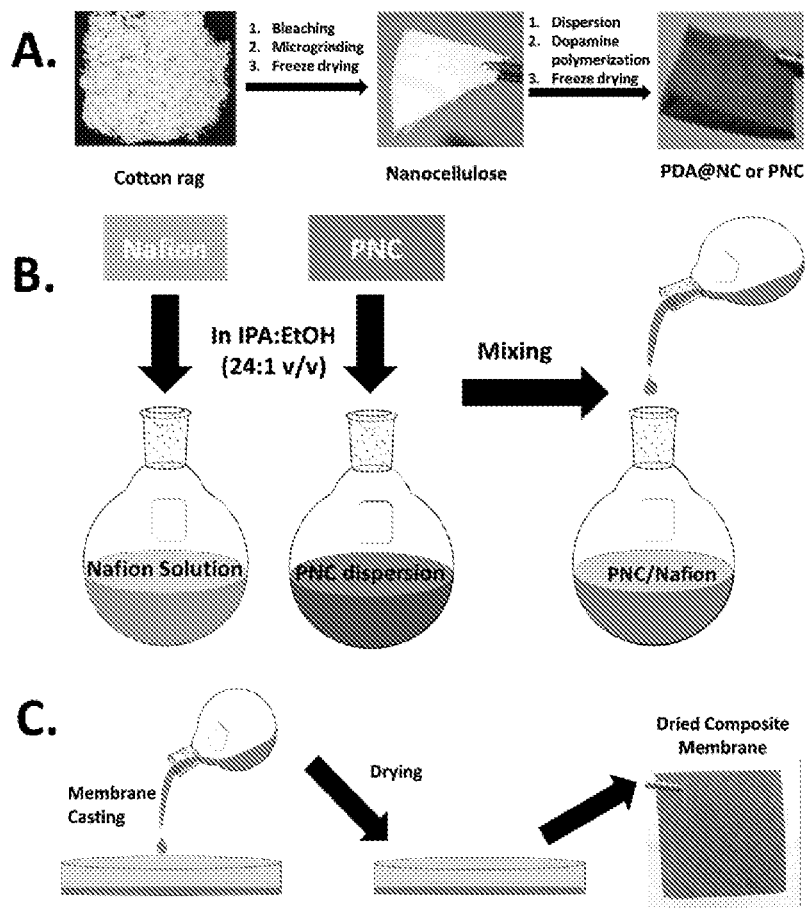

In another embodiment the present invention provides a process for the preparation of PNC/Nafion, a composite polymer electrolyte membrane. The process for the preparation of PNC/Nafion membrane comprises of three steps, which includes A) preparing cotton rag nanocellulose; B) preparing polydopamine coated nanocellulose (PNC); C) preparing PNC/Nafion membrane solution and casting membrane. The process is depicted in FIG. 12 in picturesque manner.

Polydopamine used for the coating on cellulose nano fibers is in the range of ~10-12 wt % on the dry weight of nanocellulose.

BRIEF DESCRIPTION OF THE ACCOMPANYING DRAWINGS

FIG. 1: a) TEM image of NC and b) WAXS spectra of CNF and PNC.

Figure 2:
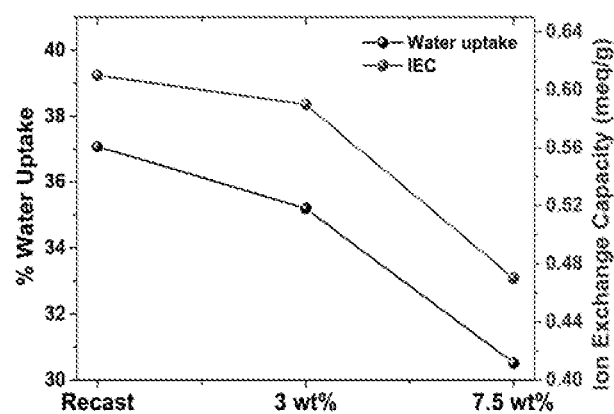
Figure 3:
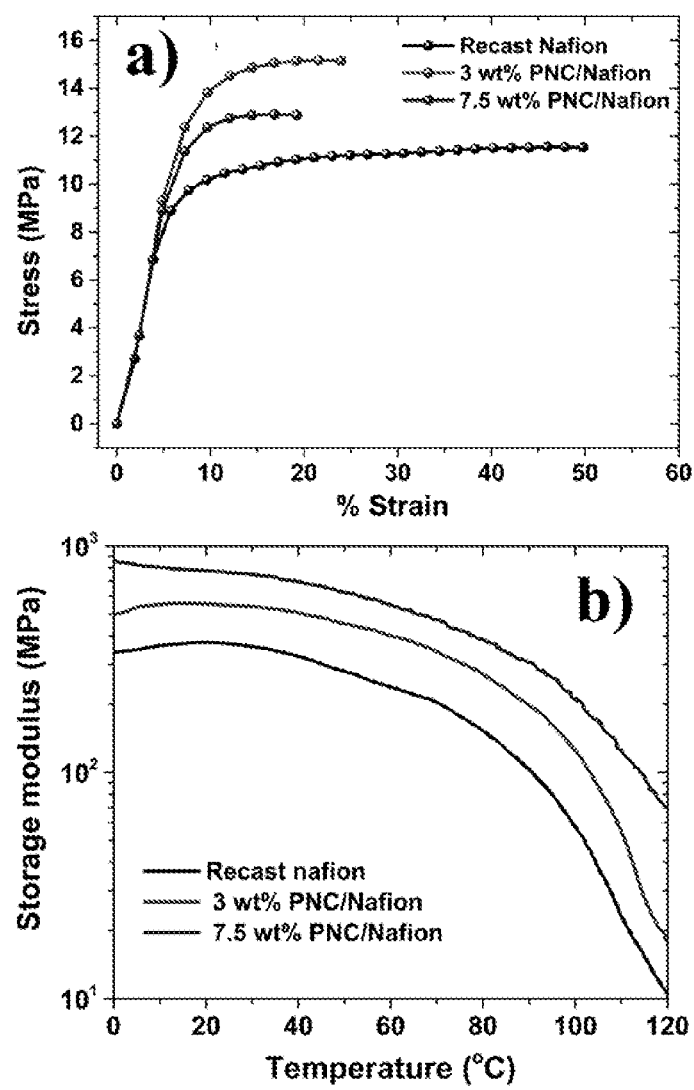

FIG. 2: Water uptake and ion exchange capacity of recast and Nafion composite membranes FIG. 3: a) Stress-Strain curve of Nafion composite membranes and b) variation of modulus of composite membrane over a range of temperature.

Figure 4:
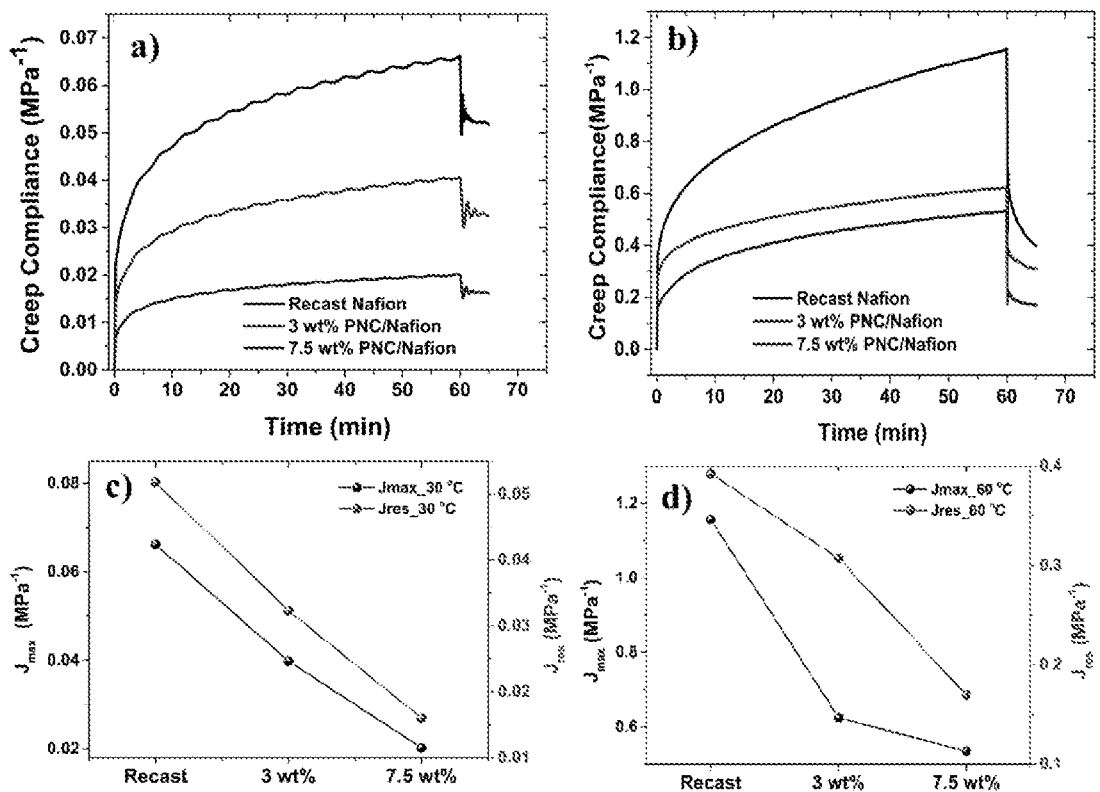

FIG. 4: Dimensional stability of composite membrane under a constant load and their recovery, a) and b) creep compliance with the time at 30° C. and 60° C.; c) and d) comparison of $J_{max}$ and $J_{res}$ values at 30° C. and 60° C.

Figure 5:
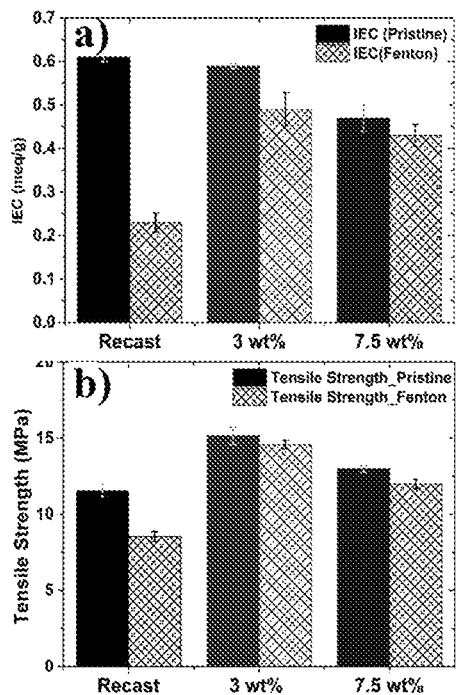

FIG. 5: a) Ion exchange capacity and b) comparison of tensile strength before and after membrane degradation test for recast and Nafion composite membranes.

Figure 6:
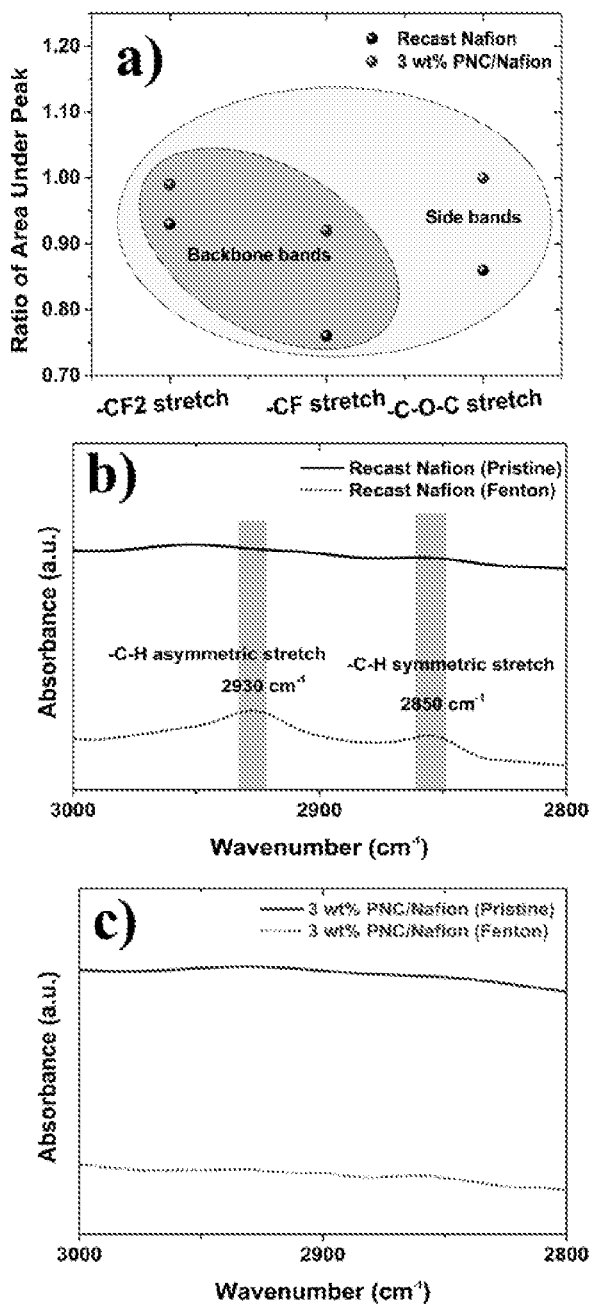

FIG. 6: ATR-FTIR analysis of membrane degradation, a) quantitative analysis based on area under the peak, b) and c) qualitative analysis.

Figure 7:
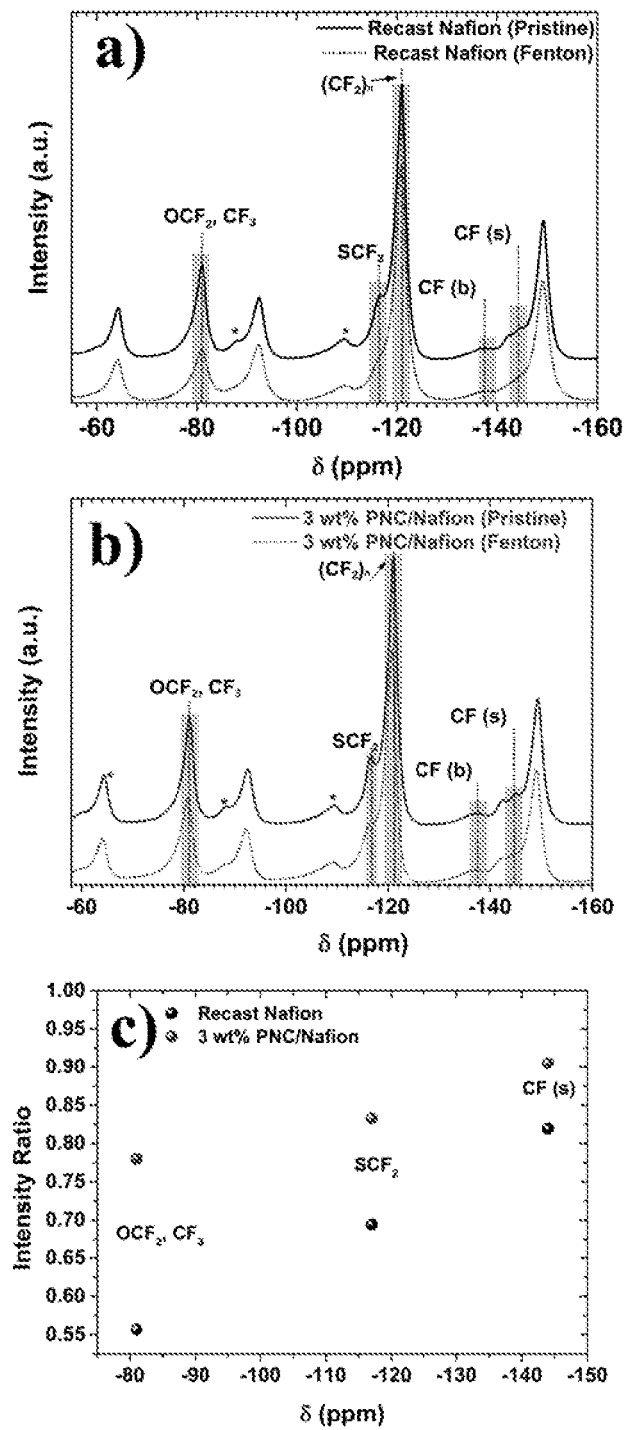

FIG. 7: a), b) $^{19}$F CP MAS solid state NMR spectral comparison of neat and composite membrane subjected to the degradation test and c) their quantitative stability.

Figure 8:
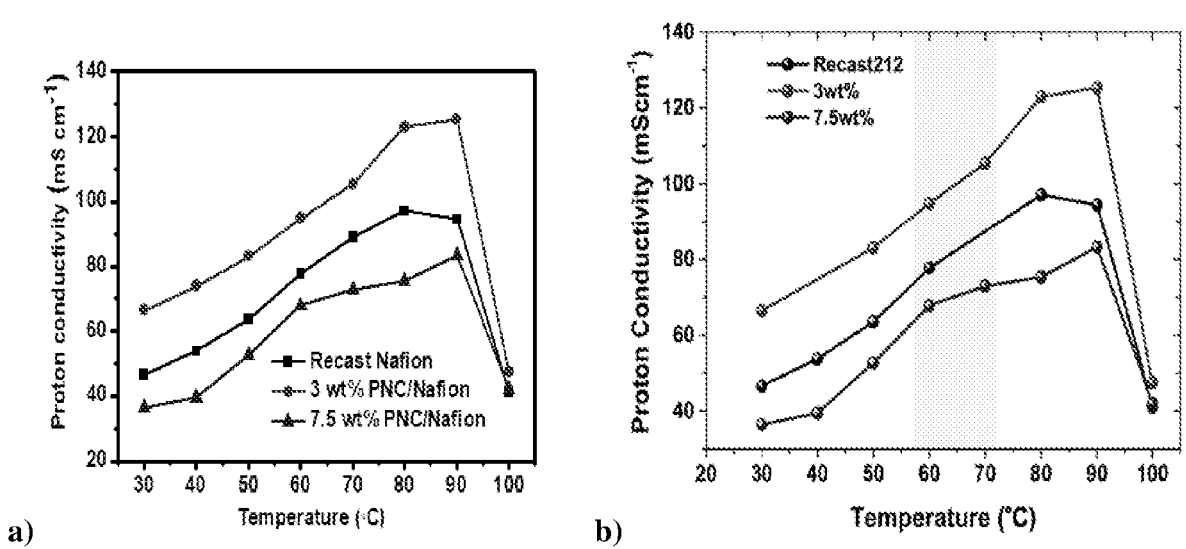

FIG. 8: a) Proton conductivity of recast Nafion and Nafion composite membranes at different temperatures under 100% relative humidity b) shows difference in proton conductivity values at 70° C.

Figure 9:
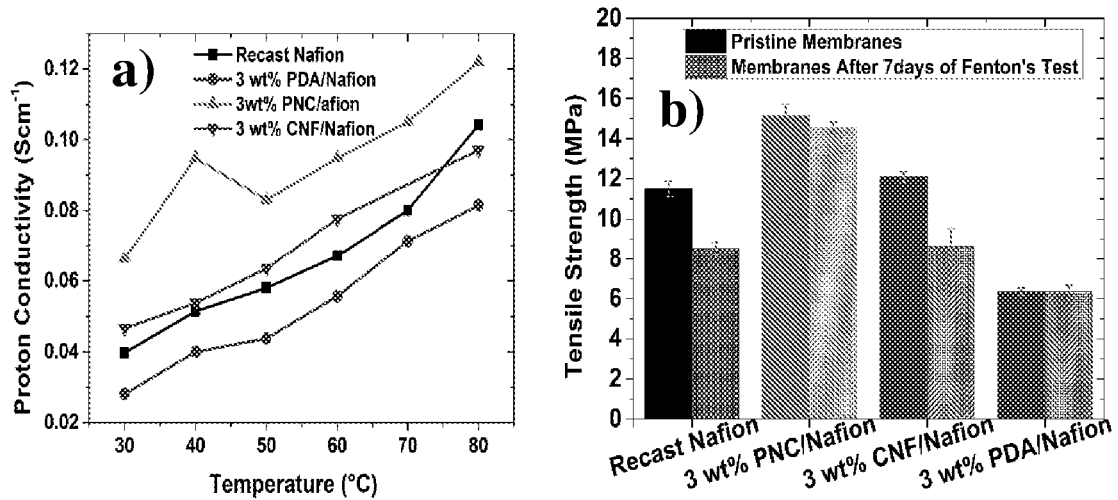

FIG. 9: Role of polydopamine and nanocellulose fibers on a) proton conductivity and b) mechanical and chemical stability of Nafion.

Figure 10:
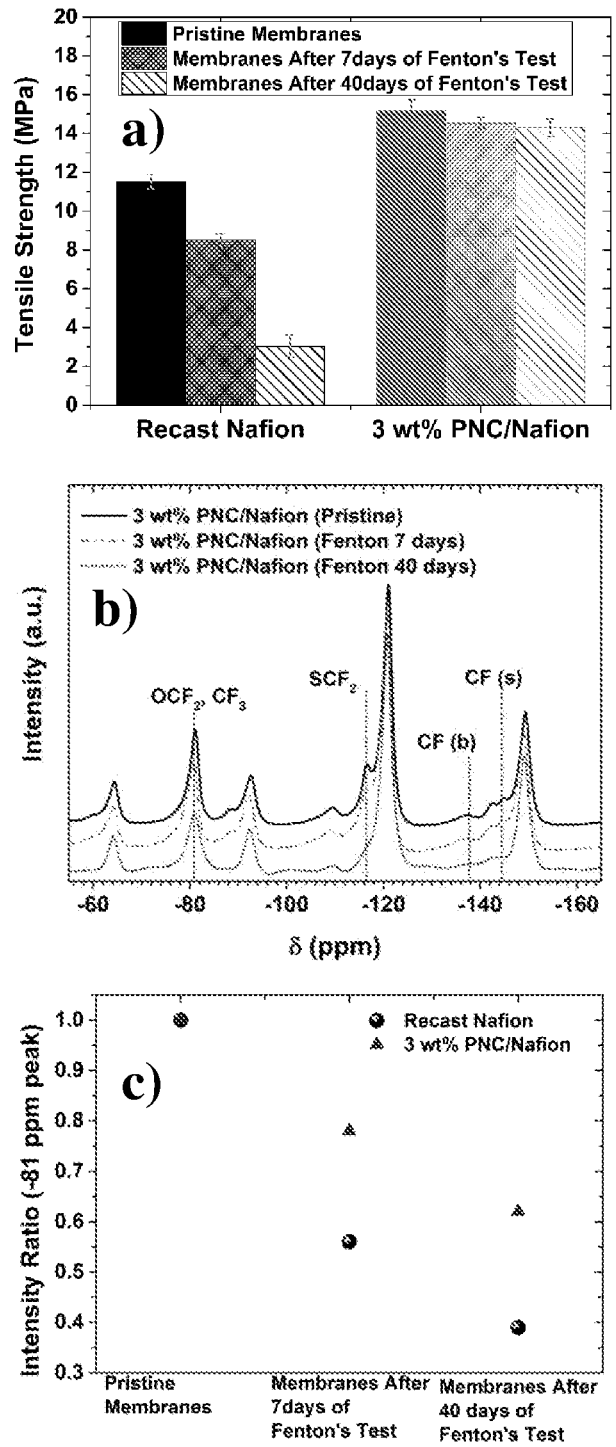

FIG. 10: Long term chemical stability of recast Nafion and 3 wt % PNC/Nafion membranes, a) tensile strength and b) 19F CP MAS solid state NMR and c) intensity ratio of degradation susceptible peak (−81 ppm) in 19F CP MAS solid state NMR.

Figure 11:
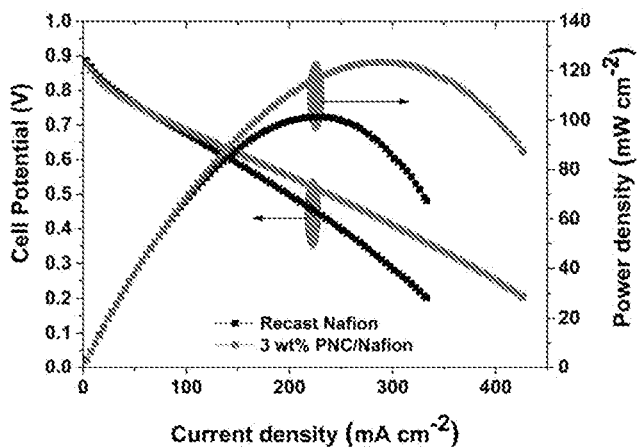

FIG. 11: H2/O2 single cell PEFC performance of recast Nafion and PNC-Nafion composite membrane at 60° C. and 80% RH.

FIG. 12: FIG. 12 represents the process of the present invention in picturesque manner.

DETAILED DESCRIPTION OF THE INVENTION

It is to be understood that the figures, schemes and descriptions of the present invention have been simplified to illustrate elements that are relevant for a clear understanding of the invention. The detailed description will be provided herein below with reference to the attached drawings, and schemes.

The present invention provides an enhancement in the chemical and thermo-mechanical stability of polymer electrolyte membranes using multifunctional polydopamine and mechanically robust nanocellulose with Nafion, wherein said stability is dependent on the concentration of polydopamine coated nanocellulose (PNC) in Nafion. 3 wt % polydopamine coated nanocellulose (PNC) concentration in Nafion results into higher chemical, thermo-mechanical and mechanical stability with higher proton conductivity. Oxidative polymerization of polydopamine on the nanocellulose fibers results into PNC and further incorporation of PNC in Nafion by solution blending results into PNC/Nafion, a composite polymer electrolyte membrane.

The invention provides further provides a process for the preparation of PNC/Nafion, a composite polymer electrolyte membrane. The process for the preparation of PNC/Nafion membrane comprises the steps of: A) preparing cotton rag nanocellulose; B) preparing polydopamine (PDA); C) polydopamine coated nanocellulose (PNC); D) preparing PDA/Nafion, CNF/Nafion and PNC/Nafion membrane solution and casting membrane. The process is depicted in FIG. 12 in picturesque manner.

More particularly, the process for the preparation of polydopamine coated nanocellulose (PNC)/Nafion composite membrane comprises the steps of:

a) preparing cotton rag nanocellulose (CNF) by treating cleaned cotton rag pieces with 10% sodium hydroxide solution followed by deionized water [DI], bleaching the obtained cotton rag with acetate buffer and 1.5 wt % sodium hypochlorite, followed by refining and grinding to obtain cotton rag nanocellulose;

b) preparing polydopamine (PDA) by dispersing dopamine hydrochloride monomer 0.5-2 mg/mL in tris-buffer solution under stirring at 70-90° C. for 20-30 hr and lyophilizing to obtain polydopamine (PDA);

c) preparing polydopamine coated nanocellulose (PNC) by dispersing 2 mg/mL nanocellulose (CNF) as prepared by step [a] in tris-buffer solution of pH 8.5 under stirring for 10-12 hr at 25° C. at a speed of 500 rpm and bath sonication for 15-20 minutes; followed by adding dopamine hydrochloride monomer into the dispersed NC solution in ratio ranging from 1:4 to 1:1 of dopamine:NC and stirring at 70-90° C. for 20-30 hr followed by lyophilizing the obtained mass to obtain polydopamine coated nanocellulose (PNC);

d) preparing Nafion solution by cutting Nafion membranes into small pieces and dissolving in a 24:1 (v/v) mixture of isopropyl alcohol and ethyl alcohol by stirring at a temperature in the range of 25-30° C. and at a speed of 500 rpm;

e) preparing a homogeneous dispersion of CNF or PDA or PNCs as obtained from above steps [a], [b] and [c] by stirring and sonicating in a 24:1 (v/v) mixture of isopropyl alcohol and ethyl alcohol by stirring at a temperature in the range of 25-30° C. and at a speed of 500 rpm with periodic bath sonication for 2-3 hr followed by adding pre-dispersed CNF or PDA or PNC solution into pre-dissolved Nafion solution as obtained from step [d] and mixing well by vortex mixing and stirring at 30° C. temperature and at a speed of 500 rpm, degassing the solution and casting in glass petridish to afford 3 wt % CNF/Nafion or 3 wt % PDA/Nafion or 3 to 7.5 wt % PNC/Nafion membrane, wherein the thickness of all the membranes at dry conditions is measured at 5 random locations and observed to be 40-55 µm.

Cellulose is an abundantly available biopolymer, having high mechanical strength and can be easily extracted from waste materials like sugarcane bagasse, cotton rags, and wood or sisal fibers by chemical or mechanical treatments. More particularly, in preferred embodiment, cotton rag obtained from commercial sources is used as a nanocellulose source. Nanocellulose is known to enhance the mechanical properties of polymers as reinforcing rigid filler.

Polymers used for the coating nanocellulose, in the process are selected from the group comprising of polydopamine, synthetic melanin and other catechol group containing polymers. More particularly, in preferred embodiment polydopamine is used for coating process.

Polymer electrolyte membranes used in process is selected from the group comprising of Nafion, polybenzimidazole (PBI), Polyether ether ketone (PEEK), Polytetrafluoroethylene (PTFE), protic ionic liquids, and protic organic ionic plastic crystals. More particularly, in preferred embodiment Nafion and polybenzimidazole (PBI) is used. In particularly preferred embodiment, Nafion is used as a polymer electrolyte membrane.

Polydopamine used for the coating on cellulose nano fibers is in the range of ~10-12 wt % on dry weight of nanocellulose. Results of 3 wt % and 7.5 wt % PNC in Nafion composite membrane show that concentration of PNC in Nafion plays a vital role. Chemical, mechanical and thermo-mechanical stability of the PNC/Nafion composite membrane varies with concentration of PNC. Proton conductivity of the PNC/Nafion composite membrane increases by 15 to 76% in the presence of 3 to 7.5 wt % PNC.

Blending with PNC shows effect on the thermomechanical properties of Nafion, by showing 50-200% improvement in storage modulus at various temperatures. PNC network also enhanced the dimensional stability of Nafion under constant stress. The 3 wt % PNC composite membrane shows a drastic reduction in creep compliance of about 39.9% and 46.5% in $J_{max}$ at 30° and 60° C., respectively. Free radical scavenging properties of polydopamine also helped to significantly enhance the chemical stability of Nafion, which is ascertained by $^{19}$F CP MAS solid state NMR, FTIR and tensile tests. Proton conductivity of ~125 mS cm$^{-1}$ is realized with 3 wt % PNC composite membrane at 90° C. and 100% RH indicates the potential of PNC/Nafion composite membrane useful for polymer electrolyte membrane fuel cells (PEMFCs). The retention of proton conductivity even with lower water uptake could be ascribed to proton hopping through polydopamine existing in the membrane.

Results of different concentrations of polydopamine coated nanocellulose (PNC) in Nafion ranging from 1 wt % to 7.5 wt % show that 3 wt % polydopamine coated nanocellulose (PNC) composite membrane possesses highly thermo-mechanical and chemical stability. Hence, results of 3 wt % and 7.5 wt % concentration of polydopamine coated cellulose (PNC) in Nafion are depicted in figures as representative results.

Overall effects of the presence of PNC in Nafion and wt % of PNC in Nafion as well as effects of the temperature on composite membrane with different wt % concentration by conducting different tests are summarized below:

1. Structural Characterization: NC fibers derived from cotton rag by ultrafriction microgrinding have diameter in the range of 20-50 nm and length exceeding 1 µm as shown in FIG. 1a. These fibres are then coated with polydopamine by in situ polymerization of dopamine. Wide angle X-ray scattering (WAXS) of NC and PNC revealed no significant change in crystalline morphology of cellulose after polydopamine modification as shown in FIG. 1b.

2. Water uptake: The water uptake of the composite membranes is found to be slightly lower than recast Nafion membrane. Recast Nafion has a water uptake of 37%, while 3 wt % and 7.5 wt % PNC/Nafion exhibited 35.2% and 30.5% water uptake, respectively as shown in FIG. 2. In a similar trend, the IEC values of recast Nafion (0.61 meqg$^{-1}$) is higher than 3 wt % PNC/Nafion (0.59 meqg$^{-1}$) and 7.5 wt % PNC/Nafion composite membrane (0.47 meqg$^{-1}$) as shown in FIG. 2.

3. Mechanical and thermomechanical stability: As shown in the FIG. 3a, addition of 3 wt % PNC increased the tensile strength of Nafion from 11.5 MPa to 15.15 MPa. Further increase in PNC concentration to 7.5 wt % led to slight decrease in the tensile strength to 13 MPa, which is still higher than recast Nafion.

FIG. 3b shows that incorporation of PNC had a very significant effect on the thermomechanical properties of Nafion which results in 200% improvement in storage modulus at elevated temperatures. The storage modulus of 3 wt % PNC/Nafion composite membrane at 30° C. is about 540 MPa which is roughly 50% higher than that of recast Nafion. FIG. 3b shows variation of modulus of the composite membrane over a range of temperature. 3 wt % PNC/Nafion composite membrane shows 70% and 96% higher modulus than recast Nafion at higher 60° C. and 90° C., respectively. The enhancement is significantly higher with higher concentration of PNC and the 7.5 wt % PNC/Nafion composite exhibited a modulus of 755 MPa (30° C.), 555 MPa (60° C.) and 310 (90° C.), which is approximately 150, 170 and 200% higher over recast Nafion at respective temperatures. The enhanced storage modulus of the membranes at higher temperature could render thermomechanical stability during the assembly of the catalyst layers by hot press and help to maintain the quality of the membrane electrode assemble (MEA) in mass production.

4. Dimensional stability of the membranes: Lower the creep compliance, higher the dimensional stability of membrane. FIGS. 4a and 4b show that recast Nafion exhibited the highest creep compliance, which is significantly reduced with PNC loading. The maximum compliance (maximum strain/stress at a constant load) is denoted as $J_{max}$ and the residual compliance ($J_{res}$) is a measure of residual strain in the membrane after the removal of load. Lower values of $J_{res}$ implies lower residual strain and higher dimensional stability. FIGS. 4c and 4d shows that recast Nafion has a $J_{max}$ of 6.62×10$^{-2}$ and 1.16 at 30° C. and 60° C., respectively. The $J_{max}$ of 3 wt % composite membrane decreased to 3.98×10$^{-2}$ and 0.62 at 30° C. and 60° C., which is approximately 39.9% and 46.5% lower than recast Nafion. $J_{res}$ for 3 wt % PNC composite membrane also shows a similar trend over the recast Nafion. The 7.5 wt % PNC composite membrane shows a drastic reduction in creep compliance of 69.5% and 61.6% in $J_{max}$ at 30° and 60° C. respectively, while $J_{res}$ dropped by 69.1% and 56.7% at 30° and 60° C., respectively. This clearly illustrates the effect of PNC on the dimensional stability of membranes.

5. Chemical stability test/membrane degradation test: The operational conditions in fuel cells lead to the generation of free radicals. These radicals react with main or side chain groups of Nafion and degrade the membrane. To check the suitability of the composite polymer electrolyte membrane for real fuel cell application, these membranes are soaked in Fenton reagent (10 ppm $Fe^{2+}$, 3 wt % $H_2O_2$) at 70° C. for 7 days. The Fenton reagent test condition is a simulated environment to provide harsh chemical conditions (generation of radicals) and evaluate oxidative/chemical stability of the membranes. The performance of membranes is ascertained by few important tests viz. ion exchange capacity measurements and tensile test. The ion exchange capacity of neat membrane reduced drastically but the composite membranes shows high retention of IEC values compared to recast Nafion as shown in FIG. 5a. The IEC value of recast Nafion dropped by 62.3% (from 0.61 to 0.23 meq/g), whereas the 3 wt % and 7.5 wt % composite membranes shows a very moderate reduction in IEC of about 16.9% and 8.5% with respect to their original values. FIG. 5b shows that the tensile strength of the recast Nafion membrane is reduced to 8.5 MPa from 11.5 MPa, which is ca. 26.1% lower than the values before chemical stability test, whereas the tensile strength of the composite membranes is reduced by only 4-8%.

The quantitative and qualitative analysis of membranes is determined by ATR-FTIR method, where main and side chains of nafion show different bands at different wavenumbers. As shown in the FIG. 6, the ratio of area under the FTIR bands before and after degradation test indicate the chemical stability of the membrane. The value close to unity implies higher chemical stability. The bands 1+2 and 4 corresponds to both backbone and side chains, whereas band 5 only corresponds for side chain in the Nafion. The recast Nafion membrane have ratio of 0.92 (for $CF_2$ stretching bands, bands 1+2) while for 3 wt % membrane the ratio is 0.99 (band 1+2), which means the $CF_2$ group is retained better in 3% composite membrane, as compared to recast Nafion membrane.

The area under the peak ratio of —C—F band (band 4) before and after Fenton's test is 0.76 and 0.92 for recast Nafion and 3 wt % composite membrane respectively. In the case of band 5, which corresponds to the side chains of Nafion backbone, recast Nafion has a ratio of only 0.86 compared to 3 wt % composite having a ratio ~1. The $CF_2$ and CF stretching bonds correspond to both backbone and side chain of Nafion, where area under the curve for these bands has decreased significantly for recast Nafion. However, the area under the curve for 3 wt % composite membrane is almost retained for all the bands under analysis. The presence of —C—H bond suggests that the degradation has happened to the backbone also. FIG. 6b is the ATR-FTIR spectra of recast Nafion after degradation test, which shows two bands at 2850 $cm^{-1}$ and 2930 $cm^{-1}$, which corresponds to symmetric and asymmetric stretching of —C—H bond. This confirms the chemical degradation of Nafion side chain and backbone. FIG. 6c shows that there is no such C—H stretching bands for 3 wt % composite membrane, which indicates the chemical stabilization of PNC against radical attack. Hence, the 3 wt % composite membrane offers superior chemical stability over recast Nafion.

$^{19}F$ Cross Polarization Magic Angle Spinning ($^{19}F$ CP MAS) solid state NMR of recast and composite Nafion membranes before and after chemical stability test also support the ATR-FTIR analysis. Both the membranes show characteristic peaks of Nafion, where the side chain of Nafion shows peaks at -81 ppm ($OCF_2$ and $CF_3$), -117 ppm ($SF_2$) and -144 (CF) as shown in FIGS. 7a and 7b. The backbone peaks of Nafion appears at -121 ppm due to $(CF_2)n$ and at -138.5 ppm due to CF bond in the main chain. The intensity of all the bands is reduced after the chemical stability test. As seen in the FTIR spectra the —CF bond of Nafion is prone to degradation which has very low intensity in the $^{19}F$ NMR spectra. So, the degradation has been quantified by taking intensity ratio of side chain peaks before and after the degradation test. As shown in FIG. 7c the intensity ratio of -81 ppm ($OCF_2$ and $CF_3$), -117 ppm ($SF_2$) and -144 (CF) reduced to 0.56, 0.69 and 0.82, respectively in Nafion, while 3 wt % composite membrane shows higher intensity ratio for these peaks 0.78, 0.83 and 0.90. The chemical stability can be attributed to the fact that PDA can scavenge the radical generated during chemical stability test. Hence, the composite membrane showed enhanced chemical resistance towards radical attack.

6. Proton conductivity: The proton conductivity of recast Nafion and PNC/Nafion composite membranes at different temperatures under 100% RH is shown in FIG. 8a. Interestingly, 3 wt % PNC/Nafion composite membrane shows higher proton conductivity than pristine Nafion from 30° C. to 90° C. at 100% RH. Nanocellulose fibers help to form percolating network within Nafion membrane and the PDA coating on nanocellulose aids proton conductivity due to presence of multiple quinone, hydroxyl and amine groups which can facilitate proton transfer by hopping from one hydrogen bonding site to another (as shown in FIG. 8b). At 30, 60 and 90° C. the recast Nafion has proton conductivity of 46.6, 77.6 and 94.6 mS/cm which has increased to 66.4, 94.9 and 125.3 mS/cm, respectively for the 3 wt % PNC/Nafion composite membrane. The 3 wt % PNC has enhanced proton conductivity of Nafion by 42, 22.5 and 32% at 30, 60 and 90° C. temperature, respectively. The proton conductivity of the 3 wt % PNC composite membrane at 80° C. and 100% RH (122 mS/cm) is comparable to or higher than previous composite membrane at similar conditions.

The proton conductivity is decreased with higher concentration of PNC below than that of recast Nafion. Thus, PNC/Nafion shows similar or better proton conductivity over other Nafion composite membranes while also offering higher dimensional stability (less creep) and superior chemical stability.

7. Role of PDA to improve the properties: To elucidate the role of PDA coating on cellulose, a series of experiments have been performed. Additional membranes are prepared and measured their proton conductivity (FIG. 9a). The 3 wt % PNC/Nafion membrane has the highest proton conductivity among all compared to recast Nafion. Proton conductivity of 3 wt % CNF/Nafion membrane is similar to Nafion, whereas adding polydopamine alone in Nafion leads to slight decrease in proton conductivity. Nanocellulose having long fiber geometry helps to form proton conducting channels where polydopamine coating on its surface helps in proton conduction by Grotthuss mechanism. Thus the mechanical stability provided by nanocellulose and the proton conducting groups in PDA complement each other for better proton conductivity, which cannot be achieved by adding them separately. To establish the role of PDA on chemical stability, these two composite membranes are compared by measuring their mechanical properties before and after Fenton test. 3 wt % PNC/Nafion membrane showed higher tensile strength of 15.15 MPa and decreased only by ~4% after chemical stability test. 3 wt % CNF/Nafion composite membrane showed lesser tensile strength (12.1 MPa) as compared to PNC/Nafion composite membrane and decreased to 8.6 Ma (~28.7%). This shows that the 3 wt % PNC membrane has higher mechanical and chemical stability as compared to 3 wt % CNF/Nafion composite membrane. It is important to note that having polydopamine alone in Nafion leads to lesser reinforcement effect as compared to CNF, but it helps to retain the mechanical stability after Fenton's test, which clearly shows the role of polydopamine in enhancing chemical stability (FIG. 9b). Thus CNF enhances mechanical stability while PDA enhances chemical stability. PDA coated CNF helps to achieve enhanced mechanical and chemical stability with high proton conductivity.

8. Long term chemical stability of recast Nafion and 3 wt % PNC/Nafion membranes: Further, to check long term stability, recast Nafion and 3 wt % PNC/Nafion composite membranes have been dipped in Fenton's reagent for 40 days at 70° C. This is a simulated and accelerated testing condition for chemical stability implying that the membranes can be expected to perform much better under normal operating conditions of a fuel cell. The mechanical properties of 3 wt % PNC/Nafion composite membrane was retained significantly (tensile strength dropped by merely 5.6%, from 15.15 MPa to 14.3 MPa), whereas the tensile strength of recast Nafion dropped drastically from 11.5 MPa to 3.04 MPa after 40 days (FIG. 10a).

This establishes that Nafion undergoes significant chemical degradation in the presence of reactive free radicals whereas PNC doped membrane have enhanced chemical stability. This is also confirmed by solid state 19F NMR analysis. The intensity of peaks near to −81 ppm ($OCF_2$ and $CF_3$), −117 ppm (SF2) and −144 (CF) for 3 wt % PNC/Nafion reduced less as compared to recast Nafion (FIG. 10b). A peak near −81 ppm ($OCF_2$ and $CF_3$) is selected, which is found to be most susceptible group to the exposure of Fenton's reagent. The peak intensity ratio before and after Fenton's test for recast Nafion was 0.56 (after 7 days of exposure), which decreased to 0.39 after 40 days of exposure. On other hand 3 wt % PNC/Nafion had this ratio of 0.78 after 7 days of exposure, which decreased to 0.62 after 40 days of exposure (FIG. 10c). This suggests that the 3 wt % PNC/Nafion membrane is more stable than recast Nafion under accelerated radical generating conditions over 40 days at 70° C.

9. PEMFC performance evaluation: The single cell PEMFC polarization and power density data of recast Nafion and PNC-Nafion composite membrane is shown in FIG. 9. Both the recast Nafion and PNC-Nafion composite membranes exhibited an open circuit voltage (OCV) of about 0.9 V. The PEMFC comprising the PNC-Nafion composite membrane exhibits a peak power density of 124 mW/cm2 at a load current density of 300 mA/cm². On the other hand, the recast Nafion delivered a peak power density of only 102 mW/cm² at a load current density of 233 mA/cm² under similar operating conditions as shown in FIG. 11. The higher PEMFC performance of the composite membrane is credited to its superior proton conductivity than that of recast Nafion membrane.

General Information:

Transmission Electron Microscopic analysis: To determine the fiber diameter, the grinded cellulose suspension was diluted to 0.05 mg/mL in DI water. The dilute dispersion was sonicated for 30 min and drop casted on carbon coated copper grid. The grid was dried for 24-36 h at 25-30° C. in a hood to remove any trace of water. The dried grid was subjected for TEM analysis at an accelerating voltage of 200 kV.

Wide angle X-ray Scattering (WAXS) analysis: WAXS is performed to determine the crystalline nature of NC and PNC. Room-temperature (25° C.) Rigaku MicroMax-007 HF with a rotating anode copper X-ray source (wavelength $\lambda$ (Cu K$\alpha$)=1.54 Å) is used at 40 kV and 30 mA for these analysis. As obtained 2-D scattering patterns are back ground subtracted and converted to 1-D profiles using Rigaku 2DP software. Scattering intensity is plotted against $2\theta$ to observe the peaks.

FTIR and NMR analysis: Attenuated total reflectance-Fourier transferred infrared (ATR-FTIR) spectroscopic analysis is performed on NC, PNC, Nafion and their composite membranes to identify any chemical changes after PDA coating on NC and after addition of PNC to the Nafion. Perkin Elmer's FTIR instrument (Spectrum GX Q5000IR) is used for these analyses using Attenuated Total Reflectance mode. Sixteen scans are performed using 4 cm$^{-1}$ resolution.

The $^{19}$F Cross Polarization Magic Angle Spinning (CP MAS) solid state NMR analysis is done on recast Nafion and their composite membrane before and after subjecting to the chemical stability test to analyze the qualitative and quantitative effect of the chemical stability test. The powder samples are prepared by cryo-crushing of membranes followed by drying under vacuum oven at 70° C. for 24 h. The analysis is done at 14 kHz using Bruker Avance III 500 MHz WB spectrometer equipped with 11.74 T super conducting magnet and 4 mm X/F/H magic angle spinning probe head. The fluorine high power decoupling experiment (HPDEC) is conducted using a single 90° excitation pulse for F and a decoupling 90° pulse for proton. The single excitation pulse length used is as 2.5 μs for F. The proton decoupling pulse length used for HPDEC is 4.8 μs. Each sample delay time varying in between 1-5 s with 32 scans.

Water uptake evaluation: Water uptake of recast Nafion and Nafion composite membranes is evaluated at 60° C. Briefly, vacuum dried membranes are soaked in DI water for 48 h. Membranes are weighed before and after soaking in water and denoted as $W_{dry}$ and $W_{soaked}$, respectively. After 48 h, soaked membranes are taken out from DI water and gently placed between the tissue paper to remove the surface water. The percentage water uptake is calculated as follows:

$$\text{Water uptake (\%)} = \frac{W_{soaked} - W_d}{W_d} \times 100$$

Ion exchange capacity test: The ion exchange capacity (IEC) is the measure of milli equivalents of ion present in 1 g of dry membrane. Membranes are soaked in saturated NaCl solution for 24 h to release the H$^+$ ions. After 24 h the solution in which membranes are soaked is titrated against 0.01 N NaOH using phenolphthalein as an indicator. The IEC is calculated using formulae given below:

$$IEC = \frac{V_{NaOH} \times C_{NaOH}}{W_{dry}} \text{meq/g}$$

Where, $W_{dry}$ is the dry weight of membrane, $V_{NaOH}$ is volume of NaOH used for titration and $C_{NaOH}$ is the concentration of NaOH.

Proton conductivity evaluation: The in-plane proton conductivity of membranes is measured by electrochemical impedance spectroscopy (EIS) technique using four probe conductivity cell with Pt electrodes (Bekktech, BT-112) at different temperatures and relative humidity (RH). The temperature and RH are controlled using humidity chamber (Espec, SH-242). The EIS spectra is obtained in the frequency range between 1 MHz and 1 Hz using potentiostat (Biologic, SP-150) and the proton conductivity of the membranes is calculated from the resistance value corresponding to the X-axis intercept using the following equation;

$$\sigma = \frac{L}{R \times W \times T} S \text{ cm}^{-1}$$

Where, $\sigma$ is the proton conductivity of the membrane in $S \text{ cm}^{-1}$; L=0.425 cm, the fixed distance between two platinum electrodes; R is the membrane resistance in $\Omega$; W is the width of the sample in cm; and T is the thickness of the membrane in cm.

Thermomechanical properties: Creep, tensile and thermomechanical properties of Nafion composite membranes are tested on Dynamical Mechanical Analyzer (DMA), TA instrument, USA (RSA3). Tensile measurements are performed to record the stress-strain behavior. The strain rate for tensile test is 0.1 mm/s. In creep experiment, samples are held at a constant force (5 N) and strain is recorded against time. After 60 min the force is removed and samples are allowed to recover. Maximum compliance ($J_{max}$) and residual compliance ($J_{res}$) is calculated using following formulae:

$$J_{max} = (S_{max})/\text{Stress and } J_{res} = (S_t)/\text{Stress}$$

Where $S_{max}$ and $S_t$ are the maximum strain and strain at time t after removing the force, stress in MPa. Modulus of composite membrane as a function of temperature is evaluated using dynamic temperature ramp test. The storage modulus is recorded as a function of temperature from 20° C. to 120° C. using temperature ramp of 2° C./min at 0.05% strain and 1 Hz frequency.

Chemical stability test: Fenton reagent is prepared as per the procedure reported earlier. Briefly, 10 ppm $Fe^{2+}$ ion solution is made in 3 wt % $H_2O_2$. The membranes are immersed in this solution and kept at 70° C. for 7 or 40 days. After 7 or 40 days, the membranes are transferred to hot DI water for washing and then dried in vacuum oven. The dried membranes are used for tensile test, water uptake, IEC measurement, FTIR and $^{19}F$ solid state NMR analysis.

EXAMPLES

The following examples are given by way of illustration only and therefore should not be construed to limit the scope of the present invention in any manner.

Material source: Dopamine hydrochloride is procured from Sigma Aldrich. Sodium hydroxide (NaOH), sodium hypochlorite (NaOCl), acetic acid, tris(hydroxymethyl)aminomethane commonly known as TRIS buffer, isopropanol (IPA), ethanol (EtOH), ferrous sulphate heptahydrate ($FeSO_4 \cdot 7H_2O$), phenolphthalein and sodium chloride (NaCl) are procured from Chemlab, India. 30% hydrogen peroxide is procured from Merck, India. Nafion 211 films are procured from Ion Power Inc., USA. All chemicals are used as received without further purification.

Example-1

Preparation of Cotton Rag Nanocellulose (CNF)

Nanocellulose was extracted from cotton rags using combined chemical and mechanical processes. Cotton rags were cut into small pieces and cleaned with deionized (DI) water. The cleaned cotton rag pieces were treated with 10% NaOH at 60-80° C. followed by washing with DI water. After NaOH treatment, the cotton rags were bleached by using equal proportion of acetate buffer (27 g NaOH and 75 mL glacial acetic acid, diluted to 1000 mL using distilled water) and 1.5 wt % sodium hypochlorite. The process was repeated multiple times (depending on the softness of the fibers) till fibers become white and subsequently washed with DI water. Bleached cotton rags were refined to a fine pulp using valley beater and then grinded by ultrafriction microgrinder (Supermass Collider, Masuko, Japan). The microfiber pulp when subjected to high shear force between a static and rotating grind wheels defibrillated into nanofibers (confirmed with TEM). Finally, the cotton rag nanocellulose (CNF) pulp was lyophilized as per requirement to obtain porous aerogels.

Example-2

Preparation of Polydopamine (PDA) and Polydopamine Coated Nanocellulose (PNC)

1.0 g of NC (2 mg/mL) was dispersed in 500 mL of 10 mM tris buffer solution by stirring for 12 hr at 25° C. and sonication was done for 20 mins. 1.0 g (2 mg/mL) of dopamine hydrochloride monomer (1:1 weight ratio with NC) was added to well dispersed NC solution. The reaction mixture was stirred at 80° C. for 24 hr. Reaction was quenched with addition of DI water. The quenched reaction mixture was filtered and washed with DI water until a colorless supernatant was obtained. Filtrate was re-dispersed in DI water and lyophilized for further use. In similar way polydopamine particles were synthesized by dispersing dopamine (2 mg/mL) in water followed by addition of tris buffer to make 10 mM solution.

Example-3

Preparation of Nafion and their Composite Membrane

The Nafion membranes were cut into small pieces and dissolved in a 24:1 (v/v) mixture of IPA and EtOH. A homogenous dispersion of CNFs or PDA or PNCs was also obtained by stirring and sonication in similar solvent mixture. The dispersion with ~51 mg of PNC or PDA or CNF was added to Nafion solution (containing 1.65 g Nafion) to result in 3 wt % Nafion composites. Similarly, the 7.5 wt % PNC/Nafion composite was prepared by adding 127.5 mg of pre-dispersed PNC to pre-dissolved 1.57 g of Nafion. As a control sample, we also prepared Nafion solution by dissolving 1.7 g of Nafion in IPA:EtOH co-solvent mixture. All the solutions were degassed at 40° C. under vacuum to remove trapped air. Degassed solutions were poured into membrane casting petri dishes and subjected to gradual evaporation of solvent at ambient conditions for 36 h and then under vacuum for 24 h to remove any residual solvent. Thickness of all the membrane at dry conditions is measured at 5 random locations and found to be ~40-55 μm and the dried membranes were used for further characterization.

Advantages:

Thermomechanical and chemical stability of Nafion is enhanced without compromising proton conductivity using polydopamine coated nanocellulose (PNC).

3 wt % PNC significantly enhances the thermomechanical stability, chemical stability of Nafion membranes as well as their proton conductivity also increases significantly.

Increased thermo-mechanical properties may lead to use in batteries and other electrochemical devices.

Nafion ink is also used in preparing catalyst ink preparation for fuel cell. Presence of PNC in Nafion can lead to better interface between carbon supported Pt catalyst and nafion and hence effective utilization of the catalyst.

The invention claimed is:

1. A process for preparing a composition for fuel cell membranes, wherein the composition comprises Nafion and 3 wt % of cellulose nanofibers coated with a polydopamine coating, wherein the polydopamine coating on the cellulose nanofibers is from 10% to 12% of a total weight of the cellulose nanofibers coated with the polydopamine coating, the process comprising:

(a) preparing cotton rag nanocellulose (CNF) by treating cleaned cotton rag pieces with 10% sodium hydroxide solution followed by deionized water [DI], bleaching the cotton rag with acetate buffer and 1.5 wt % sodium hypochlorite, followed by refining to a fine pulp using valley beater, followed by grinding in an ultrafriction microgrinder to obtain cotton rag nanocellulose;

(b) preparing polydopamine (PDA) by dispersing dopamine hydrochloride monomer 0.5-2 mg/mL in tris-buffer solution under stirring at 70-90° C. for 20-30 hr and lyophilizing to obtain polydopamine (PDA);

(c) preparing polydopamine coated nanocellulose (PNC) by dispersing 2 mg/mL cotton rag nanocellulose (CNF) as prepared by (a) in tris-buffer solution of pH 8.5 under stirring for 10 hours to 12 hours at 25° C. at a speed of 500 rpm and bath sonication for 15 minutes to 20 minutes to obtain a dispersed nanocellulose solution; followed by adding dopamine hydrochloride monomer into the dispersed nanocellulose solution in a ratio of dopamine to nanocellulose from 1:4 to 1:1 and stirring at 70° C. to 90° C. for 20 hours to 30 hours, followed by lyophilizing to obtain polydopamine coated nanocellulose (PNC);

(d) preparing Nafion solution by cutting Nafion membranes into small pieces and dissolving in a 24:1 (v/v) mixture of isopropyl alcohol and ethyl alcohol by stirring at a temperature from 25° C. to 30° C. and at a speed of 500 rpm;

(e) preparing a homogeneous dispersion of CNF or PDA or PNCs as obtained from (a), (b), and (c) by stirring and sonicating in a 24:1 (v/v) mixture of isopropyl alcohol and ethyl alcohol by stirring at a temperature from 25° C. to 30° C. and at a speed of 500 rpm with periodic bath sonication for 2 hours to 3 hours followed by adding pre-dispersed CNF or PDA or PNC solution into pre-dissolved Nafion solution as obtained from (d) and mixing well by vortex mixing and stirring at 30° C. temperature and at a speed of 500 rpm, degassing the solution and casting in a glass petri dish to afford a 3 wt % CNF/Nafion membrane or a 3 wt % PDA/Nafion membrane or a 3 wt % PNC/Nafion membrane, wherein all the membranes at dry conditions have a thickness of 40 μm to 55 μm when measured at five random locations.

* * * * *